US005409334A

United States Patent [19]

Edis et al.

[11] Patent Number: 5,409,334

[45] Date of Patent: Apr. 25, 1995

[54] VACUUM VICE FOR BOWLING BALLS

[75] Inventors: David Edis, 1500 W. Highland Ave., San Bernardino, Calif. 92411; Bert Poort, Covina, Calif.

[73] Assignee: David Edis, San Bernardino, Calif.

[21] Appl. No.: 296,849

[22] Filed: Aug. 26, 1994

Related U.S. Application Data

[63] Continuation of Ser. No. 213,884, Mar. 16, 1994.

[51] Int. Cl.[6] .......... B23C 3/00; B23B 35/00; B25B 11/00

[52] U.S. Cl. .......... 409/131; 269/21; 408/1 R; 409/225

[58] Field of Search .......... 409/131, 132, 163, 225, 409/219; 269/21, 7; 408/1 R, 76, DIG. 1; 51/289.5

[56] References Cited

U.S. PATENT DOCUMENTS

| | | | |
|---|---|---|---|
| 2,269,946 | 1/1942 | Lange | 144/93 |
| 2,283,469 | 5/1942 | Shepard | 77/63 |
| 2,398,959 | 4/1946 | Petry | 279/3 |
| 2,428,669 | 10/1947 | Hopkins | 77/63 |
| 2,490,120 | 12/1949 | Ellison et al. | 77/63 |
| 2,508,281 | 5/1950 | Miller et al. | 90/58 |
| 2,879,679 | 3/1959 | Neff | 77/63 |
| 2,910,780 | 11/1959 | Neff | 33/174 |
| 2,973,674 | 3/1961 | Hladik | 77/63 |
| 3,085,476 | 4/1963 | Sloan et al. | 90/12 |
| 3,095,767 | 7/1963 | Jesonis | 77/62 |
| 3,110,226 | 11/1963 | Dionne | 90/62 |
| 3,124,018 | 3/1964 | Gough | 77/63 |
| 3,137,074 | 6/1964 | Jesonis | 33/174 |
| 3,143,901 | 8/1964 | Bawtinheimer | 77/32.2 |
| 3,167,326 | 1/1965 | Heessels | 279/3 |
| 3,179,013 | 4/1965 | Goldsmith | 90/20 |
| 3,262,340 | 7/1966 | Sammons et al. | 77/62 |
| 3,263,531 | 8/1966 | Sammons et al. | 77/62 |
| 3,271,870 | 9/1966 | Blaker et al. | 33/174 |
| 3,304,814 | 2/1967 | Scott | 77/31 |
| 3,329,043 | 7/1967 | Stanford | 77/31 |
| 3,349,647 | 10/1967 | Stan | 77/5 |
| 3,382,740 | 5/1968 | Lotta | 77/5 |
| 3,415,146 | 12/1968 | Schroeder, Jr. | 77/62 |
| 3,460,822 | 8/1969 | Link | 269/21 |
| 3,465,619 | 9/1969 | Blaker et al. | 77/5 |
| 3,484,093 | 12/1969 | Mermelstein | 269/21 |
| 3,521,506 | 7/1970 | Di Nardo | 77/5 |
| 3,689,165 | 9/1972 | Small | 408/3 |
| 3,714,703 | 2/1973 | Maples | 29/560 |
| 3,805,394 | 4/1974 | Marberg | 33/174 |
| 3,838,865 | 10/1974 | Roberts et al. | 279/3 |
| 3,841,780 | 10/1974 | Mengeringhousen | 408/1 |
| 3,843,276 | 10/1974 | Williams | 408/236 |
| 3,955,163 | 5/1976 | Novak | 355/132 |
| 4,186,916 | 2/1980 | Varga | 269/303 |
| 4,391,511 | 7/1983 | Akiyamma et al. | 355/40 |
| 4,414,748 | 11/1983 | Gauler | 269/21 X |
| 4,494,895 | 2/1983 | Leaf | 408/236 |
| 4,534,093 | 8/1985 | Jahnke et al. | 29/26 |
| 4,561,642 | 12/1985 | Parque | 269/21 |
| 4,582,460 | 4/1986 | Silverberg et al. | 409/175 |
| 4,684,113 | 8/1987 | Douglas et al. | 269/21 |
| 4,723,766 | 2/1988 | Beeding | 269/21 |
| 4,815,903 | 3/1989 | Skidmore, Sr. | 409/131 |
| 5,017,056 | 5/1991 | Morash | 408/1 R |
| 5,028,182 | 7/1991 | Park | 409/225 |
| 5,173,016 | 12/1992 | Ellison et al. | 409/132 |

FOREIGN PATENT DOCUMENTS

| | | | |
|---|---|---|---|
| 490746 | 6/1992 | European Pat. Off. | 269/21 |
| 5253777 | 10/1993 | Japan | 269/21 |
| 608407 | 5/1976 | Switzerland . | |
| 890302 | 2/1962 | United Kingdom . | |

*Primary Examiner*—William Briggs
*Attorney, Agent, or Firm*—Robbins, Berliner & Carson

[57] ABSTRACT

A vacuum vice for holding a bowling ball when drilling holes or engraving the ball includes inner and outer o-rings seals which form two vacuum chambers that work together to form a seal with a bowling ball having surface imperfections or engraving. The inner vacuum chamber holds the ball to a buoyant cup. The outer vacuum chamber seats the ball against a contoured, hard rim surface and is connected by a leakage path around the inner seal to a piston chamber which pulls on the buoyant cup to further seat the ball. The outer seal is mounted on a movable housing that automatically adjusts to the size of the ball.

16 Claims, 2 Drawing Sheets

VACUUM VICE FOR BOWLING BALLS

CROSS REFERENCE TO RELATED APPLICATION

This is a continuation application of U.S. patent application Ser. No. 08/213,884, filed Mar. 16, 1994.

BACKGROUND OF THE INVENTION

1. Field of the Invention

This invention relates to devices for holding bowling balls while finger holes and weighting holes are drilled in the ball. In particular, the present invention relates to vacuum chucks used to hold a bowling ball steady during drilling.

2. Description of the Prior Art

Common mechanical vices are awkward and difficult to use for holding heavy, round objects such as bowling balls, while drilling. An improvement over mechanical vices is the vacuum vice, shown for example, in U.S. Pat. No. 5,173,016. Such conventional vacuum vices typically include a vacuum chamber and a hard rim which makes a seal with the bowling ball. It is difficult to make a vacuum tight seal between the hard surface of the bowling ball and the hard rim, so additional sealing techniques, such as a movable, external soft sealing ring, have been used to reduce leakage. Such conventional vacuum vices are not completely effective when there are imperfections in the surface of the bowling ball. For example, nicks or engraving in the ball break the seal between the ball and the prior art vacuum vice, thus reducing its ability to hold the ball effectively.

What is needed is a vacuum vice which can form a vacuum tight seal while holding a bowling ball in an exact position determined, for example, by a hard rim, in spite of imperfections in the surface of the bowling ball.

SUMMARY OF THE INVENTION

In a first aspect, the present invention provides a vacuum vice for holding bowling balls including a housing for supporting a bowling ball, a resilient circular seal in the housing surrounding a first portion of the bowling ball, a circular support on the housing surrounding a second portion of the bowling ball including the first portion and an outer portion surrounding the first portion, and means for forming a vacuum between the housing and the first portion of the bowling ball to seat the bowling ball against the circular support.

In another aspect, the present invention provides a method for holding bowling balls by supporting a bowling ball in a housing, surrounding a first portion of the bowling ball with a resilient circular seal in the housing, surrounding a second portion of the bowling ball, including the first portion and an outer portion surrounding the first portion, with a circular support on the housing, and forming a vacuum between the housing and the first portion of the bowling ball to seat the bowling ball against the circular support.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT

The vacuum vice of the present invention securely holds bowling balls of various sizes and weights during drilling and engraving even if the balls have surface imperfections such as nicks and engraving. A buoyant cup with a soft compressible inner seal forms an inner vacuum chamber against the ball in the interior of the contoured hard rim surface on which the ball is seated. An outer vacuum chamber is formed which holds the ball against the hard rim and pulls against the buoyant cup, further urging the ball against the rim.

Figure 1:
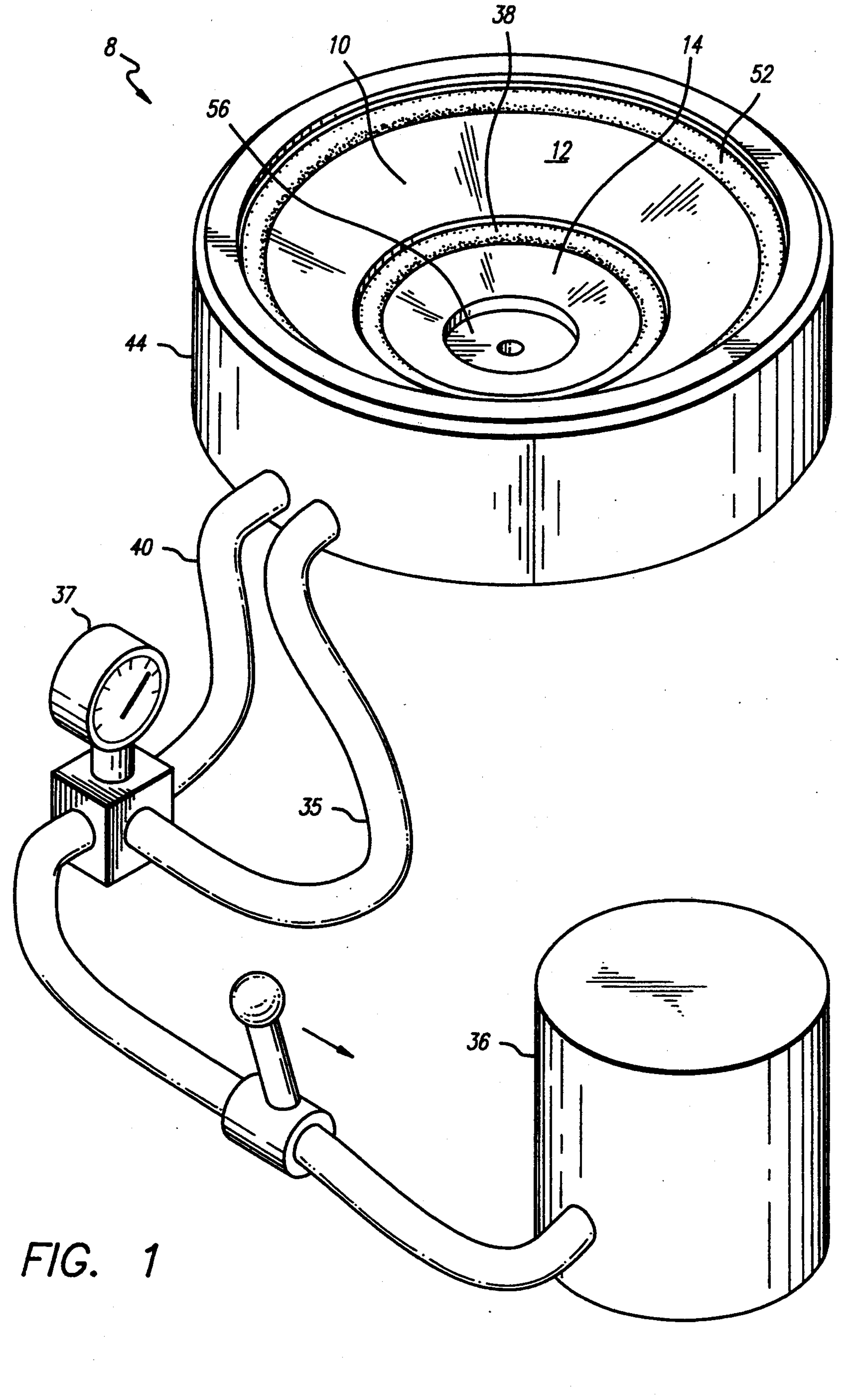
FIG. 1 is an isometric view of the vacuum vice of the present invention.
Figure 2:
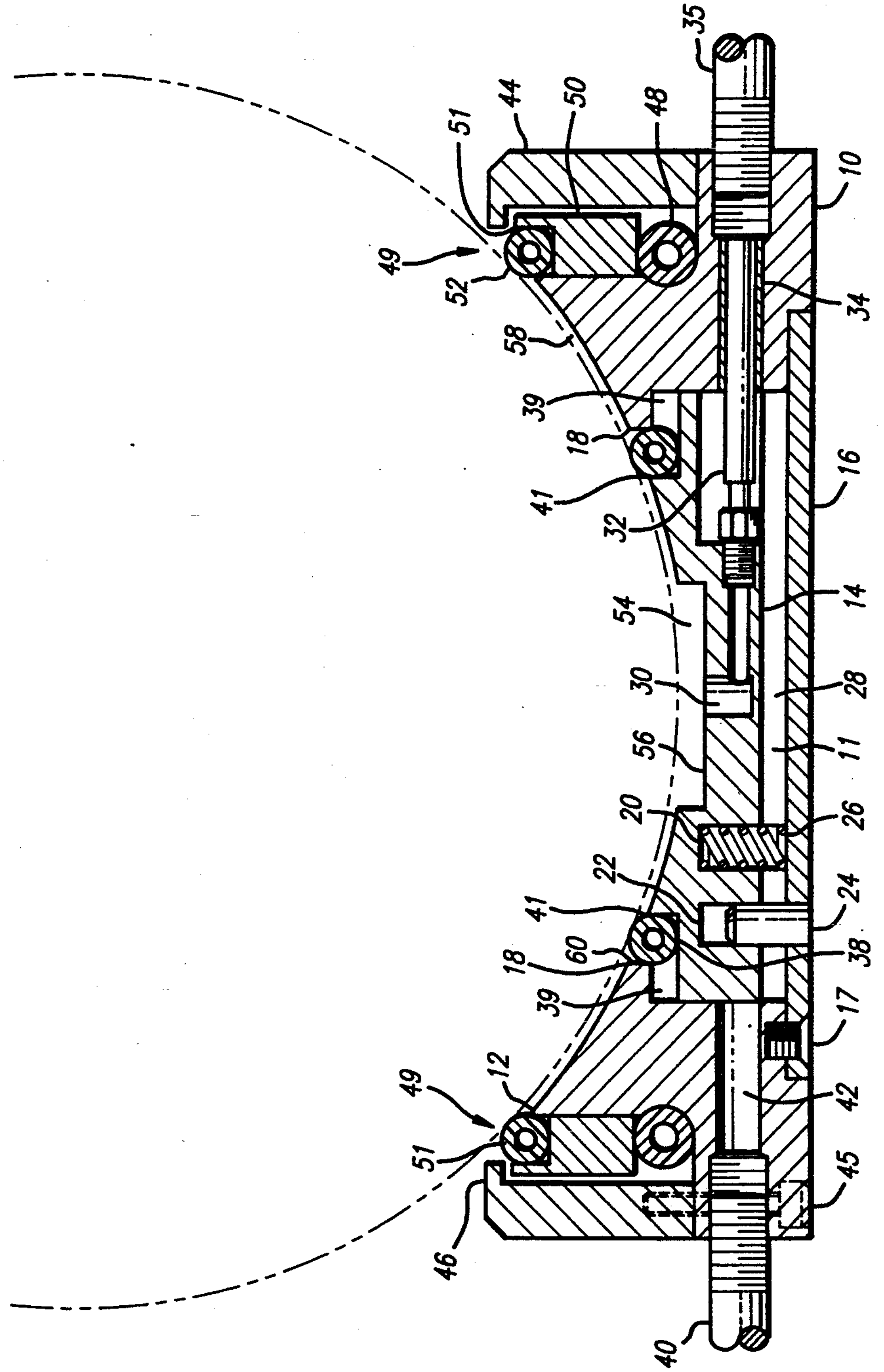
FIG. 2 is a cross section of the vacuum vice of the present invention.

Vacuum vice 8 of the present invention is shown in FIG. 1 and FIG. 2. Main body or housing be is made of a suitably hard substance, such as anodized aluminum, for supporting a bowling ball on hard rim surface 12. Hard rim surface 12 is contoured to fit the shape of the bowling ball while the bottom of housing 10 is generally flat, allowing it to be secured firmly to a flat mating surface on the milling or engraving machine with which it is to be used.

Buoyant cup 14 sits loosely in central cavity 11 of housing 10, at the interior of hard rim surface 12, forming the piston of piston chamber 28. Buoyant cup 14 is mounted for vertical motion within central cavity 11, but is constrained therein because the diameter of sealing surface 39 at the widest portion of buoyant cup 14 is greater than the diameter of inner lip 18 at the interior of hard rim surface 12. The top of buoyant cup 14 is generally concave to match the shape of a bowling ball and forms a generally continuous curve with the concave upper surface of hard rim surface 12 of housing 10. Buoyant cup 14 may conveniently be made of the same hard material as housing 10 and hard rim surface 12, such as anodized aluminum. The bottom of buoyant cup 14 is flat and contains spring receptacles 20 and dowel receptacles 22.

The generally flat bottom of housing 10 includes a recessed area in which bottom cover 16 is attached to form a smooth flat continuous bottom for vacuum vice 8. Bottom cover 16 is flat, contains dowels 24, and is attached to housing 10 with flathead screws 17 or similar attaching means.

When bottom cover 16 is placed under buoyant cup 14, dowels 24 are aligned and placed into dowel receptacles 22 of buoyant cup 14. Dowels 24 prevent buoyant cup 14 from rotating within the center of housing 10. Buoyant cup 14 sits on springs 26 which are placed in spring receptacles 20 and hold buoyant cup 14 above bottom cover 16. A presently preferred embodiment includes three springs 26 and two dowels 24. The space between buoyant cup 14 and bottom cover 16 forms piston chamber 28 in the central cavity of housing 10. Buoyant cup 14 forms the piston in piston chamber 28.

Buoyant cup 14 also contains buoyant cup passageway 30 leading from the top center of buoyant cup 14, half way down the center of buoyant cup 14, and then turning horizontal and exiting from the side of buoyant cup 14. In a presently preferred embodiment, the vertical portion of buoyant cup passageway 30 has about a one-quarter inch ($\frac{1}{4}''$) diameter, and the horizontal portion has about a one-eighth inch (⅛") diameter. Buoyant cup hose 32 is connected to buoyant cup passageway 30. Buoyant cup hose 32 extends through first housing passageway 34, a hole running horizontally through housing 10. First vacuum hose 35 connects buoyant cup hose 32 with vacuum source 36. In a presently preferred embodiment, first housing passageway 34 has a one-quarter inch (¼") diameter. As shown in FIG. 1, pressure gauge 37 may be attached between vacuum source 36 and vacuum vice 8.

Lower o-ring or inner seal 38 is located in the gap between the circumference of buoyant cup 14 and inner lip 18 at the interior of hard rim surface 12. In a presently preferred embodiment, inner seal 38 sits on flat, sealing surface 39 extending from outer cup rim 41 at the outer circumference of buoyant cup 14. Inner seal 38 is made of a soft compressible material, such as hollow rubber or surgical tubing and, in a currently preferred embodiment, has an external diameter of about five-sixteenths of an inch (5/16") which substantially fills the space between outer cup rim 41 and inner lip X8 in which inner seal 38 is positioned. The width of sealing surface 39 is approximately twice the external diameter of inner seal 38 to maintain a good seal even when inner seal 38 is compressed.

Additionally, in a currently preferred embodiment, second vacuum hose 40 connects vacuum source 36 to second housing passageway 42, a hole through housing 10. In a currently preferred embodiment, second housing passageway 42 has a one-quarter inch (¼") diameter.

In addition to inner seal 38 provided at the interior of hard rim surface 12, outer seal 49 is provided in a space between the outer edge of hard rim surface 12 and outer housing 44 which is mounted to housing be by screws 45 or other securing means. Outer housing lip 46 of outer housing 44 restrains outer seal 49.

In a presently preferred embodiment, outer seal 49 includes inner o-ring 48, movable housing 50, and upper o-ring 52. Upper o-ring 52 and inner o-ring 48 may conveniently be made of hollow rubber tubing. Upper o-ring 52 has the same external and internal diameters as inner seal 38, and inner o-ring 48 has external and internal diameters fractions of an inch larger than the diameters of upper o-ring 52. More specifically, in a currently preferred embodiment, the external diameter of upper o-ring 52 is five-sixteenths of an inch (5/16"), and the external diameter of inner o-ring 48 is three-eighths of an inch (⅜").

In a presently preferred embodiment, movable housing 50 includes vertical riser 51 adjacent to outer housing 44. The height vertical riser 51 is about three-quarters (¾) of the external diameter of upper o-ring 52 which sits on an upper flat surface of movable housing 50. The space between outer housing lip 46 of outer housing 44 and the outer circumference of hard rim surface 12 is smaller than the diameter of upper o-ring 52 so that upper o-ring 52 can not accidently be pulled from vacuum vice 8. Outer housing lip 46 also retains movable housing 50 within vacuum vice 8.

In operation, a bowling ball placed into vacuum vice 8 compresses inner seal 38 to create inner vacuum chamber 54 between the ball and buoyant cup 14. Inner seal 38 is soft and compressible and allows for an increasingly wide area of contact with the bowling ball as inner seal 38 is compressed. The resulting seal is strong. Referring to FIG. 2, as contact between a bowling ball and inner seal 38 occurs, buoyant cup 14 is pushed down upon springs 26. Inner vacuum chamber 54 is created by switching on vacuum source 36 which must be capable of providing enough suction to hold the bowling ball so that it can be drilled. In a currently preferred embodiment, the amount of vacuum pressure applied is 27 psi. Under most conditions, the bowling ball is held against buoyant cup 14 by the vacuum in inner vacuum chamber 54 with sufficient force to permit drilling finger and/or weighting holes.

To enhance the holding characteristics of inner vacuum chamber 54, buoyant cup 14 may contain circular recession 56 in the center of its upper surface. In a presently preferred embodiment, circular recession 56 has a diameter about half the diameter of buoyant cup 14. More specifically, circular recession 56 is about one and one-half inches (1½") in diameter and about one-eighth inch (⅛") deep.

To further improve the holding capability of vacuum vice 8 to hold the ball against hard rim surface 12, outer seal 49 is used to both create an additional vacuum holding chamber and also to increase the force with which inner vacuum chamber 54 holds the ball against hard rim surface 12. As the bowling ball contacts inner seal 38 and pushes buoyant cup 14 down, the bowling ball simultaneously contacts and compresses outer seal 49 at the outer periphery of hard rim surface 12. In operation of outer seal 49, pressure exerted on upper o-ring 52 is transferred by movable housing 50 to inner o-ring 48. This compresses inner o-ring 48, and both movable housing 50 and upper o-ring 52 move down allowing vacuum vice 8 to adapt to differing ball sizes and weights.

Outer seal 49 forms outer vacuum chamber 58 between hard rim surface 12 and the ball which holds the ball against hard rim surface 12. Inner vacuum chamber 58 extends from the outer periphery of hard rim surface 12 to inner lip 18 at the inner periphery of hard rim surface 12 and is connected, by leakage path 60 at the outer edge of inner seal 38, to the central cavity of housing 10 which includes piston chamber 28. A vacuum is drawn by vacuum source 36 through second vacuum hose 40 into second housing passageway 42 which is directly connected to the central inner cavity of housing 10, including piston chamber 28. Air in outer vacuum chamber 58, sealed at one end by outer seal 49, is drawn through leakage path 60 into central cavity 11 and evacuated therefrom through second housing passageway 42 and second vacuum hose 40 thereby drawing a vacuum in piston chamber 28 which is part of piston chamber 28.

As air is evacuated from piston chamber 28 buoyant cup 14 is drawn away from the bowling ball. The vacuum in inner vacuum chamber 54, between the ball and buoyant cup 14, serves to hold the ball against buoyant cup 14. The result of evacuating air from piston chamber 38 is therefore to draw buoyant cup 14 down as a piston and thereby draw the ball more tightly against hard rim surface 13, further compressing outer seal 49 which reduces any leakage by that seal.

It is important to note that there are two operable vacuum chambers possible with the present invention. The first vacuum chamber is inner vacuum chamber 54 which serves to hold buoyant cup 14 against the ball. The second vacuum chamber, connected to vacuum source 36 through a separate set of passageways, includes two subchambers, outer vacuum chamber 58 and piston chamber 38 which are connected to each other via leakage path 60. The vacuum in this second set of chambers serves, in outer vacuum chamber 58, to hold the ball against hard rim surface 12, and in piston chamber 28, to pull buoyant cup 14 and therefore the ball, harder against hard rim surface 12.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A vacuum vice for holding a bowling ball, comprising:

a housing for supporting a bowling ball;

a resilient circular seal in the housing surrounding a first portion of the bowling ball;

a circular support on the housing surrounding a second portion of the bowling ball including the first portion and an outer portion surrounding the first portion and in a different plane than said seal; and means for forming a vacuum between the housing and the first portion of the bowling ball to seat the bowling ball against the circular support.

2. The invention of claim 1, further comprising:

means for applying the vacuum, between the housing and the first portion of the bowling ball, across the circular seal to form a vacuum between the housing and the outer portion of the bowling ball.

3. The invention of claim 1, further comprising:

a cup in the housing for supporting the circular seal.

4. The invention of claim 3, further comprising:

means for applying forces to the cup to further seat the bowling ball against the circular support.

5. The invention of claim 1, wherein the circular support further comprises:

a circular hard rim surface contoured to support a bowling ball.

6. The invention of claim 5, wherein the circular support further comprises:

an outer circular seal adjacent the inner periphery of the circular hard rim surface.

7. The invention of claim 6, further comprising:

means for applying the vacuum between the housing and the first portion of the bowling ball across the circular seal to form a vacuum between the outer circular seal and the outer portion of the bowling ball.

8. The invention of claim 1, wherein the circular support is a circular hard rim surface contoured to support a bowling ball in the housing, and the invention further comprises:

a buoyant cup mounted for motion relative to the housing, the resilient circular seal being mounted on the buoyant cup; and seating means for applying forces to the buoyant cup to seat the bowling ball against the hard rim surface.

9. A method for holding bowling balls, comprising the steps of:

supporting a bowling ball in a housing;

surrounding a first portion of the bowling ball with a resilient circular seal in the housing;

surrounding a second portion of the bowling ball, including the first portion and an outer portion surrounding the first portion, with a circular support on the housing in a different plane than said seal; and forming a vacuum between the housing and the first portion of the bowling ball to seat the bowling ball against the circular support.

10. The invention of claim 9, further comprising the step of:

applying the vacuum between the housing and the first portion of the bowling ball across the circular seal to form a vacuum between the housing and the outer portion of the bowling ball.

11. The invention of claim 9, further comprising the step of:

supporting the circular seal on a cup in the housing.

12. The invention of claim 11, further comprising the step of:

applying forces to the cup to further seat the bowling ball against the circular support.

13. The invention of claim 9, wherein the step of supporting the bowling ball in the housing further comprises the step of:

supporting the bowling ball on a contoured circular hard rim surface on the housing.

14. The invention of claim 13, further comprising the step of:

positioning an outer circular seal adjacent the inner periphery of the circular hard rim surface.

15. The invention of claim 14, further comprising the step of:

applying the vacuum between the housing and the first portion of the bowling ball across the circular seal to form a vacuum between the outer circular seal and the outer portion of the bowling ball.

16. The invention of claim 9, wherein the circular support is a circular hard rim surface contoured to support a bowling ball in the housing, and the invention further comprises the steps of:

mounting a buoyant cup for motion relative to the housing;

mounting the resilient circular seal on the buoyant cup; and applying forces to the buoyant cup to seat the bowling ball against the hard rim surface.

* * * * *